United States Patent [19]

D. DeLavalette et al.

[11] 4,206,482
[45] Jun. 3, 1980

[54] ELECTRONOPTICAL APPARATUS FOR ANALYSING DOCUMENTS

[75] Inventors: Pierre D. DeLavalette; Philippe Brolly, both of Paris, France

[73] Assignee: Thomson-CSF, Paris, France

[21] Appl. No.: 939,775

[22] Filed: Sep. 5, 1978

[30] Foreign Application Priority Data

Sep. 9, 1977 [FR] France .................. 77 27314

[51] Int. Cl.² .............................................. H04N 1/06
[52] U.S. Cl. ..................................... 358/290; 250/236; 358/292
[58] Field of Search .............. 358/264, 285, 289, 290, 358/292, 206, 208; 250/236; 350/6.5, 6.6, 6.9, 6.91

[56] References Cited

U.S. PATENT DOCUMENTS

| | | | |
|---|---|---|---|
| 2,450,649 | 10/1948 | Finch | 358/289 |
| 3,142,224 | 7/1964 | Andrews et al. | 358/292 |
| 3,273,446 | 9/1966 | Goetz et al. | 358/292 |
| 3,346,692 | 10/1967 | Garfield et al. | 358/264 |
| 3,816,652 | 6/1974 | Barnett | 358/292 |

FOREIGN PATENT DOCUMENTS

156972  3/1964  U.S.S.R. ..................... 358/208

OTHER PUBLICATIONS

Hayes–Scanner for Opaque Samples–IBM Tech. Discl. Bull. vol. 16, #9, Feb. 1974, pp. 2826-2828.

*Primary Examiner*—Robert L. Griffin
*Assistant Examiner*—Joseph A. Orsino, Jr.
*Attorney, Agent, or Firm*—Cushman, Darby & Cushman

[57] ABSTRACT

An electronoptical apparatus consisting essentially in optical and mechanical devices enabling a document 1 to be telecopied to be kept in a fixed position during its dot-by-dot analysis effected along a line by scanning by means of a rotating mirror 3 associated with an electronoptical unit 7, both mounted on a carriage 4 to which a step-by-step movement is imparted with each change of line.

1 Claim, 1 Drawing Figure

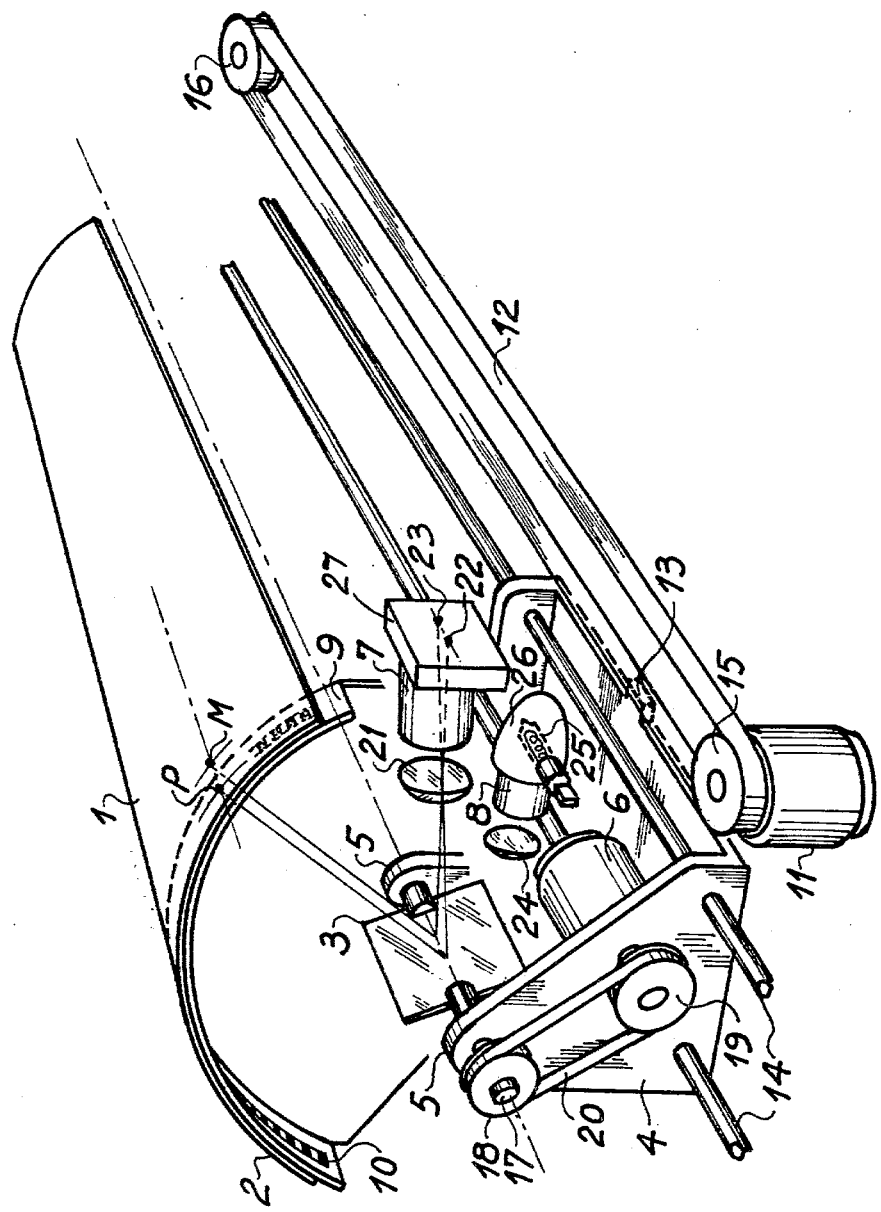

ELECTRONOPTICAL APPARATUS FOR ANALYSING DOCUMENTS

This invention relates to electronoptical apparatus for analysing documents and, in particular, to apparatus of the type used in facsimile transmission systems, in which the documents are divided up into a series of individual dots which are designated black or white by a photoelement and then delivered after suitable coding through a transmission means to a suitable receiver where this series of dots is reconstituted, thus producing a copy of the analysed document.

Conventional apparatus for analysing documents for facsimile transmission are divided into two main categories. In the first category, the document to be analysed is fixed to a drum by means of clips. An electronoptical unit, generally consisting of an illuminating lamp, a focusing lens and a phototransistor, moves parallel to the axis of rotation of the drum while the drum supporting the document rotates. The document is thus mechanically scanned by means of a simple photoelement. Apparatus of this type are attended by various disadvantages. Thus, the document is difficult to fix in position, in addition to which the document to be analysed is not completely stable because, through the action of centrifugal forces, it is not possible to keep each point of the surface of the document at a precise distance from the electronoptical unit in spite of the fixing elements provided for this purpose. This disadvantage may be obviated by using a protective sleeve enveloping the document, but this involves extra work for the user.

In the second category of apparatus, the document to be analysed is transported by rollers and belts past a slot behind which is situated an electronoptical unit which may comprise either a single photoelement combined with an optical scan of the slot (for instance by displacement of an aperture) or a photosensitive component into which photoelements are integrated in a number corresponding to the number of dots to be analysed in one line of the document. The main disadvantage attending apparatus of this second category arises out of the transport of the document which is in danger of being destroyed in the event of mishandling. In addition, the associated electronoptical units are onerous because they generally comprise either an additional optical scan or integrated circuits of large dimensions and, hence, a lens having a high power of resolution. Finally, it is difficult to obtain a constant intensity of illumination over a line of the document with incandescent lamps or fluorescent tubes dimensions comparable with those of the line.

According to the invention, there is provided an electronoptical analysis apparatus for point to point analysing documents comprising:
— a fixed cylindrical sector of transparent material of which the convex surface is in contact with the document to be analysed,
— a chassis including,: an optical device, at least one main photoelement, and illuminating means,
— means for imparting a step-by-step movement to said chassis in a direction parallel to the axis of said cylindrical sector,
said optical device comprising a mirror rotating about an axis coinciding with said cylindrical sector axis and one focusing system lens of which the axis encounters on one side said sector axis and on the other side the support of said photoelement, said illuminating means illuminating said mirror along an axis fairly parallel to said focusing lens system axis in order to simultaneously obtain illuminating and analysing of successively scanned points.

The invention will be better understood from the following description in conjunction with the accompanying drawing which is a diagrammatic perspective view of an electronoptical apparatus for analysing documents according to the invention.

In the FIGURE, a fixed cylindrical sector 2 of glass acts as support for a document 1 intended to be reproduced, of which it has at least the external dimensions. This sector 2 is fixed by means of a fixing device (not shown) to two runners 14 which extend parallel to the axis of the sector 2 and which support a chassis 4 mounted in such a way that it can be moved along these runners by means of a step-by-step motor 11 through pulleys 15 and 16 driving a belt 12 which is fixed to a boss 13 of the chassis 4.

Through two bearings 5, the chassis 4 supports a shaft 17, of which the axis coincides with that of the cylindrical sector 2, about which may rotate a mirror 3 driven through pulleys 18 and 19 and a belt 20 by means of a motor 6 which is also fixed to the chassis 4.

The chassis also supports a cylindrical sector 9 which is concentric with the sector 2, but has a slightly smaller radius so that it is able to slide at most closely to its concave surface. Its height is limited to the value necessary for supporting on its inner surface a pattern 10 formed by a regular alternate succession of black and white dashes along a line defined by a plane perpendicular to its axis, the spacing between the dashes being determined in dependence upon the required level of resolution.

Finally, the chassis comprises an electronoptical unit 7 and a projector 8. The unit 7 essentially comprises a focusing lens 21, of which the axis encounters the axis of the shaft 17 perpendicularly and substantially at the centre of the mirror 3, and two phototransistors 22 and 23 fixed to a common support 27 so as to be situated on an axis parallel to the axis of the shaft 17 and perpendicular to the axis of the lens.

The projector 8 essentially comprises a lens 24, an incandescent lamp 25 and a projector 26 which directs the light beam towards the mirror 3.

For a suitable choice of the length of the radius of the cylindrical sector 2, the convergence of the lens 21 and its position relative to the phototransistors 22 and 23 and the axis of the mirror 3, it will be possible to obtain on the photoelement 22, for the illustrated position of the mirror 3, a clear real image of a point M of the document 1 through its image as supplied by the mirror 3. By virtue of the fact that the axis of rotation of the mirror coincides with the axis of the cylindrical sector 2, there will be obtained by rotation of this mirror an equally clear image of any point of this sector which is situated in a plane perpendicular to these axes and passing through the point M because the optical path between this point and the lens 21 is thus rendered constant. An optical system for scanning a line of the document 1 is thus formed.

Similarly, the photoelement 23 will receive a clear image of a point P of the pattern 10 situated in a plane containing the point M and the common axis of the cylindrical sectors 2 and 9 for the illustrated position of the mirror 3 which, during its rotation, will scan at the points P and M their respective parallel lines, leaving them aligned at any instant with a straight line parallel to this common axis.

The light beam of the projector 8, which is reflected by the mirror 3, is designed to be wide enough simultaneously to illuminate the points M and P which it follows during their movement because it is deflected by the same mirror.

The movement of the chassis 4 along two runners parallel to the common axis of the cylindrical sectors 2 and 9 by means of a step-by-step motor 11 enables the document 1 to be completly scanned in the following manner:

The chassis 4 is placed in a position which enables the first line of the document to be read, the mirror 3 rotates clockwise and the projector 8 is illuminated. When the mirror 3 reaches a suitable inclination, the point P corresponds to the first black dot of the pattern 10. The phototransistor 23 releases a "beginning of line" signal and controls the reading of the photoelement 22. An elementary rotation of the mirror 3 places P on the second black dot of the pattern, the phototransistor 23 releases a signal controlling the operation of the phototransistor 22 which analyses the corresponding point M of the line, and so on up to the last dot of the pattern 10 which terminates the line to be analysed. An instruction is then given to the motor 11 to move the chassis 4 by one step and the cycle described above recommences up to the end of the document to be analysed.

This apparatus has numerous advantages:
—the document to be analysed is fixed so that there is no danger of damage;
—there is no need to use a high-precision motor for rotating the mirror since the rhythm of the analysis is determined by reading the pattern, so that this solution is in no way onerous;
—it is possible to concentrate a considerable luminous flux into a very small surface with a low-output illuminating lamp of which the parasitic heating is minimal and does not necessitate special ventilation;
—the intensity of illumination of all the points of the document is independent of the position of the dots to be analysed and, apart from output, of transmission by the mirror.

It is obvious that this description is in no way limiting and that various modifications may be made without departing from the scope of the invention.

In particular, various beginning-of-page and end-of-page stops, either electromechanical or based on partial masking of the pattern 10, may be provided in the apparatus according to the invention.

Similarly, the projector 8 equipped with an incandescent lamp may be replaced in certain applications by a laser.

What is claimed is:

1. An electronoptical analysis apparatus for point to point analysing documents comprising:
   — a fixed cylindrical sector of transparent material having an outer surface in contact with the document to be analyzed, and an inner surface
   — a chassis including: an optical device, a main and an additional photoelement fixed on a common support, and illuminating means,
   — means for imparting a step-by-step movement to said chassis in a direction parallel to the axis of said cylindrical sector,
   — an additional cylindrical sector fixed to said chassis and concentric with said fixed cylindrical sector, but slightly smaller in radius so that it slides inside and very close to said fixed sector,
   said optical device comprising a mirror rotating about an axis coinciding with said cylindrical sector axis and one focusing system lens having an axis which encounters on one side said sector axis and on the other side said support, said illuminating means illuminating said mirror along an axis sufficiently parallel to said focusing lens system axis such that successively scanned points are illuminated at the same time that they are analyzed by said main photoelement, the height of said additional sector having the value required to place on said inner surface of said additional sector along a line defined by a plane perpendicular to the axis of additional sector a pattern formed by a series of black and white dashes, and said additional photoelement being capable of receiving the image of a dash of said pattern through said mirror.

* * * * *

UNITED STATES PATENT AND TRADEMARK OFFICE
CERTIFICATE OF CORRECTION

PATENT NO. : 4,206,482
DATED : June 3, 1980
INVENTOR(S) : de Lacroix de Lavalette et al It is certified that error appears in the above—identified patent and that said Letters Patent is hereby corrected as shown below:

Please correct the name of the first inventor in the above-identified patent as follows:

--PIERRE DE LACROIX DE LAVALETTE--

Signed and Sealed this

Eighteenth Day of November 1980

[SEAL]

Attest:

Attesting Officer

SIDNEY A. DIAMOND

Commissioner of Patents and Trademarks